US012306765B2

(12) United States Patent
Chiu

(10) Patent No.: US 12,306,765 B2
(45) Date of Patent: May 20, 2025

(54) METHOD AND NON-TRANSITORY COMPUTER-READABLE STORAGE MEDIUM AND APPARATUS FOR UPDATING HOST-TO-FLASH ADDRESS MAPPING TABLE

(71) Applicant: Silicon Motion, Inc., Zhubei (TW)

(72) Inventor: Shen-Ting Chiu, Miaoli County (TW)

(73) Assignee: Silicon Motion, Inc., Zhubei (TW)

( * ) Notice: Subject to any disclaimer, the term of this patent is extended or adjusted under 35 U.S.C. 154(b) by 151 days.

(21) Appl. No.: 17/971,403

(22) Filed: Oct. 21, 2022

(65) Prior Publication Data

US 2023/0161713 A1 May 25, 2023

(30) Foreign Application Priority Data

Nov. 23, 2021 (CN) .......................... 202111392787.7

(51) Int. Cl.
*G06F 12/1009* (2016.01)
(52) U.S. Cl.
CPC .. *G06F 12/1009* (2013.01); *G06F 2212/7201* (2013.01)
(58) Field of Classification Search
CPC .................... G06F 12/1009; G06F 2212/7201
See application file for complete search history.

(56) References Cited

U.S. PATENT DOCUMENTS

2013/0326121 A1* 12/2013 Cheng ................. G06F 12/0246
711/103
2016/0124649 A1  5/2016 Liu et al.
2018/0329816 A1  11/2018 Hsu
2019/0303299 A1  10/2019 Su
2020/0218652 A1*  7/2020 Huang ................. G06F 3/0659
2021/0303159 A1   9/2021 Ke

FOREIGN PATENT DOCUMENTS

CN   108874300 A   11/2018
TW   201942751 A   11/2019
TW   202137006 A   10/2021

OTHER PUBLICATIONS

Taiwanese Search Report issued in Application No. 110143439 dated Jul. 20, 2022.

* cited by examiner

*Primary Examiner* — Kalpit Parikh
(74) *Attorney, Agent, or Firm* — Birch, Stewart, Kolasch & Birch, LLP

(57) ABSTRACT

The invention relates to a method, a non-transitory computer-readable program product and an apparatus for updating a host-to-flash address mapping (H2F) table. The method includes: allocating space in a random access memory (RAM) for a first H2F sub-table and intermediate information, which is used to update a second H2F sub-table in a flash module; updating the first H2F sub-table and the intermediate information temporarily stored in the RAM during an execution of a host write command or a host discard command; and in a table update procedure, programming the first H2F sub-table temporarily stored in the RAM into a system block in the flash module, updating the second H2F sub-table according to the intermediate information stored in the RAM, and programming updated second H2F sub-table into the system block in the flash module.

18 Claims, 8 Drawing Sheets

METHOD AND NON-TRANSITORY COMPUTER-READABLE STORAGE MEDIUM AND APPARATUS FOR UPDATING HOST-TO-FLASH ADDRESS MAPPING TABLE

CROSS-REFERENCE TO RELATED APPLICATIONS

This application claims the benefit of priority to Patent Application No. 202111392787.7, filed in China on Nov. 23, 2021; the entirety of which is incorporated herein by reference for all purposes.

BACKGROUND

The disclosure generally relates to storage devices and, more particularly, to a method, a non-transitory computer-readable storage medium and an apparatus for updating a host-to-flash address mapping table.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

To improve the performance for reading and programming data from and into a flash module, the flash controller utilizes multiples channels to perform the data reads and writes in parallel. In order to gain advantage of parallel processing, continuous data is distributed to be stored in flash units connected to the channels and a host-to-flash address mapping table (also called as H2F table) is used to record mapping relationships between logical addresses (managed by a host side) and physical addresses (managed by the flash controller) for user-data segments. However, the programming of the H2F table into the flash units also affects the performance of the overall system. Thus, it is desirable to have a method, a non-transitory computer-readable storage medium and an apparatus for updating the host-to-flash address mapping table to improve overall system performance.

SUMMARY

In an aspect of the invention, an embodiment introduces a method for updating a host-to-flash address mapping (H2F) table to include: allocating space in a random access memory (RAM) for a first H2F sub-table and intermediate information, which is used to update a second H2F sub-table in a flash module; updating the first H2F sub-table and the intermediate information temporarily stored in the RAM during an execution of a host write command or a host discard command; and in a table update procedure, programming the first H2F sub-table temporarily stored in the RAM into a system block in the flash module, updating the second H2F sub-table according to the intermediate information stored in the RAM, and programming updated second H2F sub-table into the system block in the flash module.

The host write command is executed to program data into the flash module, and the host discard command is executed to discard data in the flash module In another aspect of the invention, an embodiment introduces a non-transitory computer-readable storage medium for updating a H2F table to include computer program code when being executed by a processing unit to realize the above method.

In still another aspect of the invention, an embodiment introduces an apparatus for updating a H2F table to include: a RAM; a flash interface (I/F), coupled to a flash module; and a processing unit, coupled to the RAM and the flash I/F. The processing unit is arranged operably to: allocate space in the RAM for a first H2F sub-table and intermediate information, which is used to update a second H2F sub-table in the flash module; update the first H2F sub-table and the intermediate information temporarily stored in the RAM during an execution of a host write command or a host discard command; and in a table update procedure, program the first H2F sub-table temporarily stored in the RAM into a system block in the flash module through the flash I/F, update the second H2F sub-table according to the intermediate information stored in the RAM, and program updated second H2F sub-table into the system block in the flash module through the flash I/F.

Both the foregoing general description and the following detailed description are examples and explanatory only, and are not restrictive of the invention as claimed.

BRIEF DESCRIPTION I/F THE DRAWINGS

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
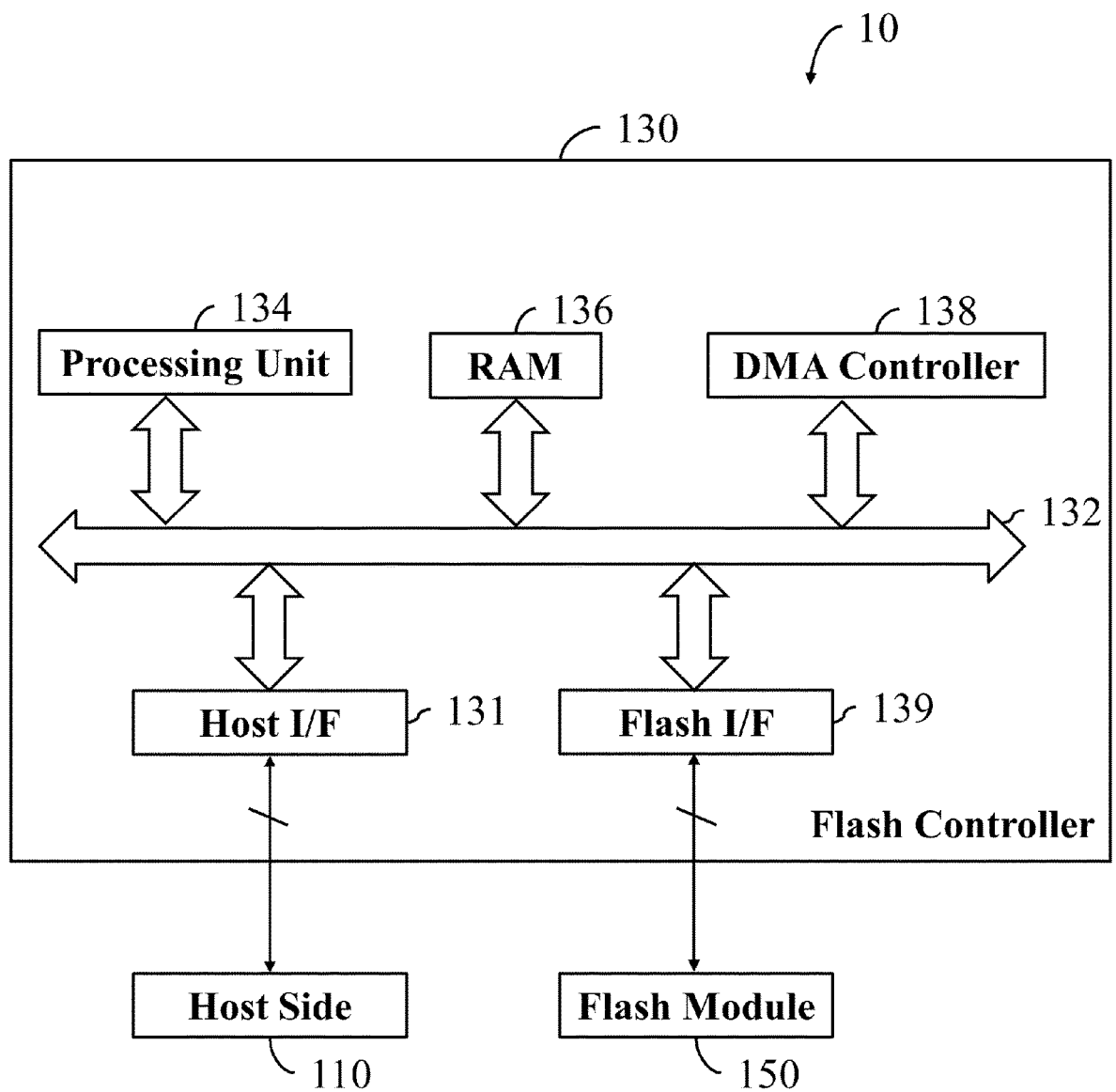
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, a smart television, a smart refrigerator, a smart range hood, an automotive electronics system, or other consumer electronic products. The host side 110 and the host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors; or graphics processing units capable of parallel computations, or others) that is programmed using firmware and/or software instructions to perform the functions recited herein. The processing unit 134 receives host commands, such as host read, write, trim, discard, erase commands, through the host I/F 131, schedules and executes these commands. The flash controller 130 includes a Random Access Memory (RAM) 136 and the RAM 136 may be implemented in a Dynamic Random Access Memory (DRAM), a Static Random Access Memory (SRAM), or the combination thereof, for allocating space as a data buffer storing user data (also referred to as host data) that is to be programmed into the flash module 150, and has been read from the flash module 150 and is to be output to the host side 110. The RAM 136 stores necessary data in execution, such as variables, data tables, data abstracts, host-to-flash address mapping (referred to as H2F in brief) tables, flash-to-host address mapping (referred to as F2H in brief) tables, and so on. The flash I/F 139 includes a NAND flash controller (NFC) to provide functions that are required to access to the flash module 150, such as a command sequencer, a Low Density. Parity Check (LDPC) encoder/decoder, etc.

The bus architecture 132 may be configured in the flash controller 130 for coupling between components to transfer data, addresses, control signals, etc., which include the host I/F 131, the processing unit 134, the RAM 136, the direct memory access (DMA) controller 138, the flash I/F 139, and so on. In some embodiments, the host I/F 131, the processing unit 134, the RAM 136, the DMA controller 138, the flash I/F 139 are coupled to each other by a single bus. In alternative embodiments, a high-speed bus is configured in the flash controller for coupling the processing unit 134, the DMA controller 138 and the RAM 136 to each other and a low-speed bus is configured for coupling the processing unit 134, the DMA controller 138, the host I/F 131 and the flash I/F 139 to each other. The DMA controller 138 may move data between the components through the bus architecture according to instructions issued by the processing unit 134, for example, moving data in a specific data buffer of the host I/F 131 or the flash I/F 139 to a specific address of the RAM 136, moving data in a specific address of the RAM 136 to a specific data buffer of the host I/F 131 or the flash I/F 139, or others.

The bus includes a set of parallel physical-wires connected to two or more components of the flash controller 130. The bus is a shared transmission medium so that only two devices can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash module 150 provides huge storage space typically in hundred Gigabytes (GB), or even several Terabytes (TB), for storing a wide range of user data, such as high-resolution images, video files, etc. The flash module 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals run on physical wires including data lines, a clock signal line and control signal lines for coordinating the command, address and data transfer with the flash module 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
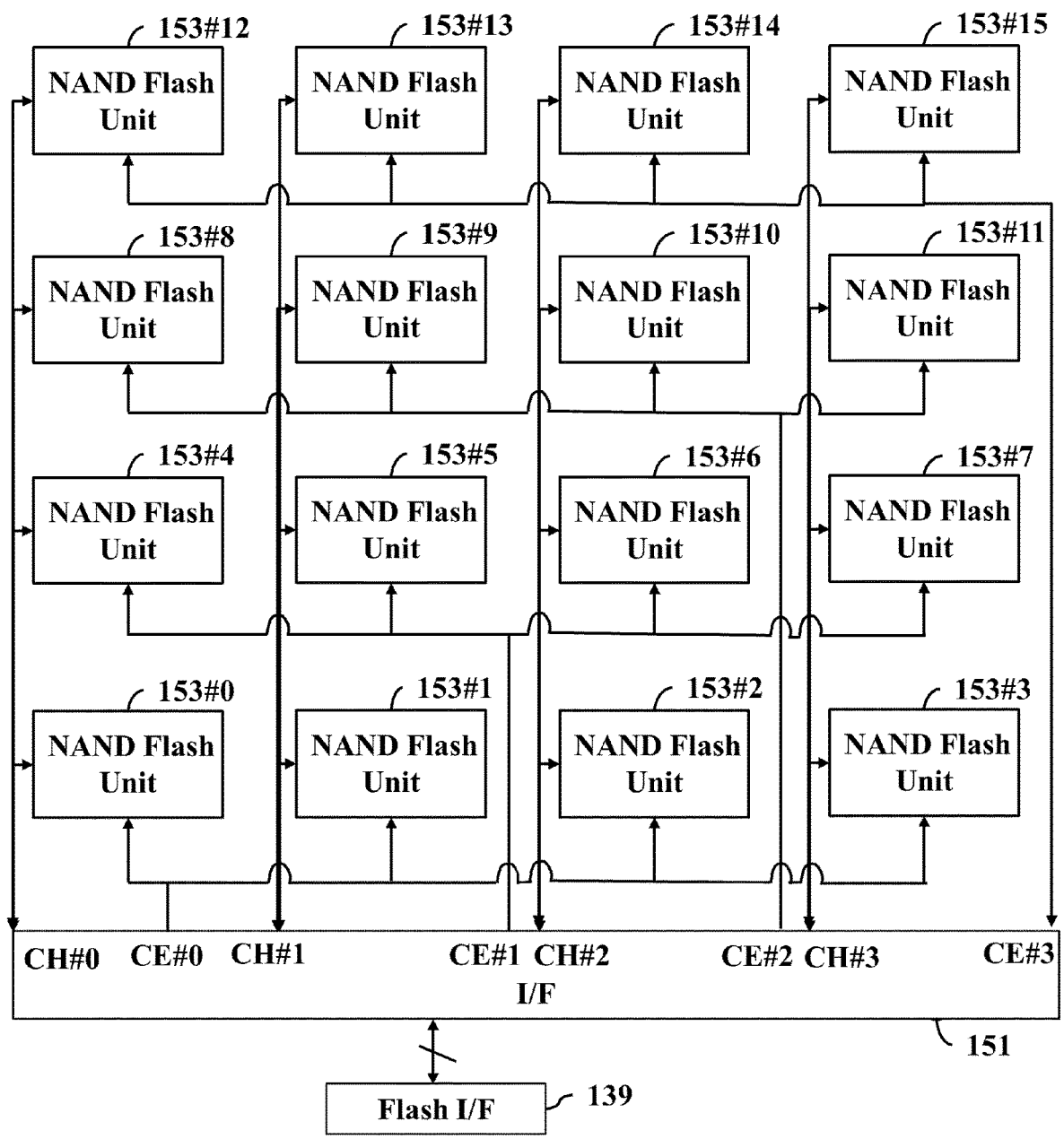
FIG. 2 is a schematic diagram illustrating a flash module according to an embodiment of the invention.

Refer to FIG. 2. The flash I/F 151 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153

3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
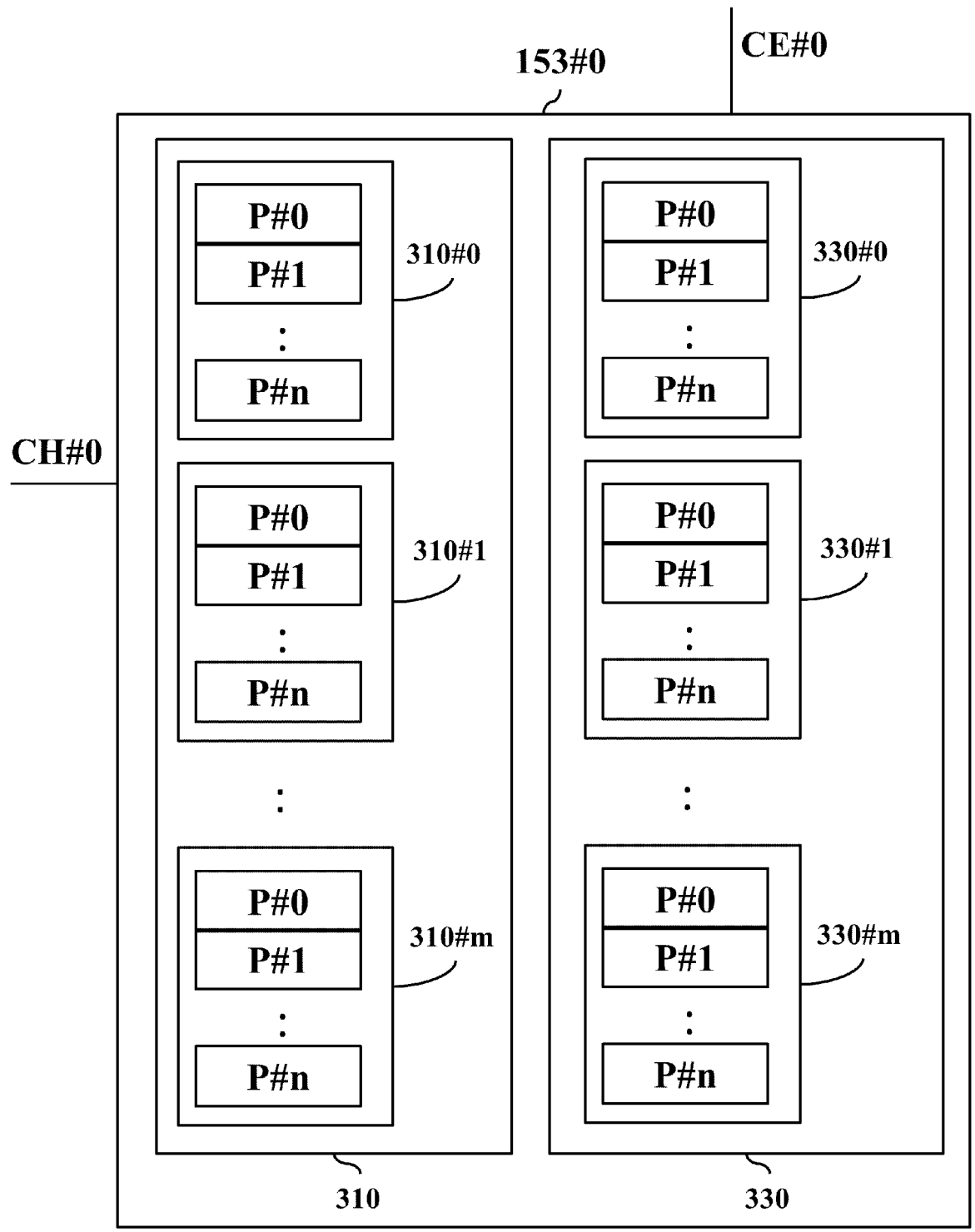
FIG. 3 is a schematic diagram illustrating NAND flash units according to an embodiment of the invention.

Each NAND flash unit may include multiple data planes, each data plane may include multiple physical blocks and each physical block may include multiple physical pages. Refer to FIG. 3 for an embodiment of a NAND flash unit. The NAND flash unit 153 #0 includes two data planes 310 and 330. The data plane 310 includes physical blocks 310 #0 to 310 #m and the data plane 330 includes physical blocks 330 #0 to 330 #m. Each physical block includes n+1 physical pages. The NAND flash units, the physical blocks and the physical pages may be identified by Logical Block Numbers (LUNs), block numbers and page numbers, respectively, and any combinations of the above numbers can be called as physical addresses of the flash module 150.

Each physical block may be distinguished into a data block, a current block or a system block according to its function. The processing unit 134 selects one empty physical block from many as a current block in each data plane of each NAND flash unit for preparing to program user data received from the host side 110. To enhance the efficiency of data writes, the user data provided by the host side 110 can be programmed into specific pages of multiple current blocks of the data planes of the NAND flash units in parallel. The processing unit 134 may maintain a Flash-to-Host address mapping (F2H) table in the RAM 16 for each current block, which contains multiple records arranged in the order of page numbers. Each record stores information indicating which logical address that user data of the corresponding page of the current block is associated with. The logical address managed by the host side 110 may be represented by a Logical Block Address (LBA), a host page number, or other expression. For example, each LBA relates to 512 bytes (512B) of user data while each host page number relates to 4 kilobytes (4 KB) of user data. The processing unit 134 may drive the flash I/F 139 to program the corresponding F2H table in the RAM 136 into a designated page (e.g. the last page) of the current block or an empty page of other designated physical block after all available pages of a current block are full of user data or the remaining available pages of a current block are filled with dummy values. After the corresponding F2H table has been programmed into the flash module 150, the current clock is changed to a data block, in other words, the user data stored therein cannot be modified and no data can be programmed thereinto. Subsequently, the processing unit 134 may select another empty physical block from many as a new current block. Additionally, the processing unit 134 may configure a specific physical block as a system block for storing management information, for example, a flash identifier (ID), a bad block table, a bad column table, a Host-to-Flash address mapping (H2F) table, and so on. The F2H table may also be referred to as a Physical-to-Logical (P2L) table and the H2F table may also be referred to as a logical-to-physical (L2P) table.

Figure 4:
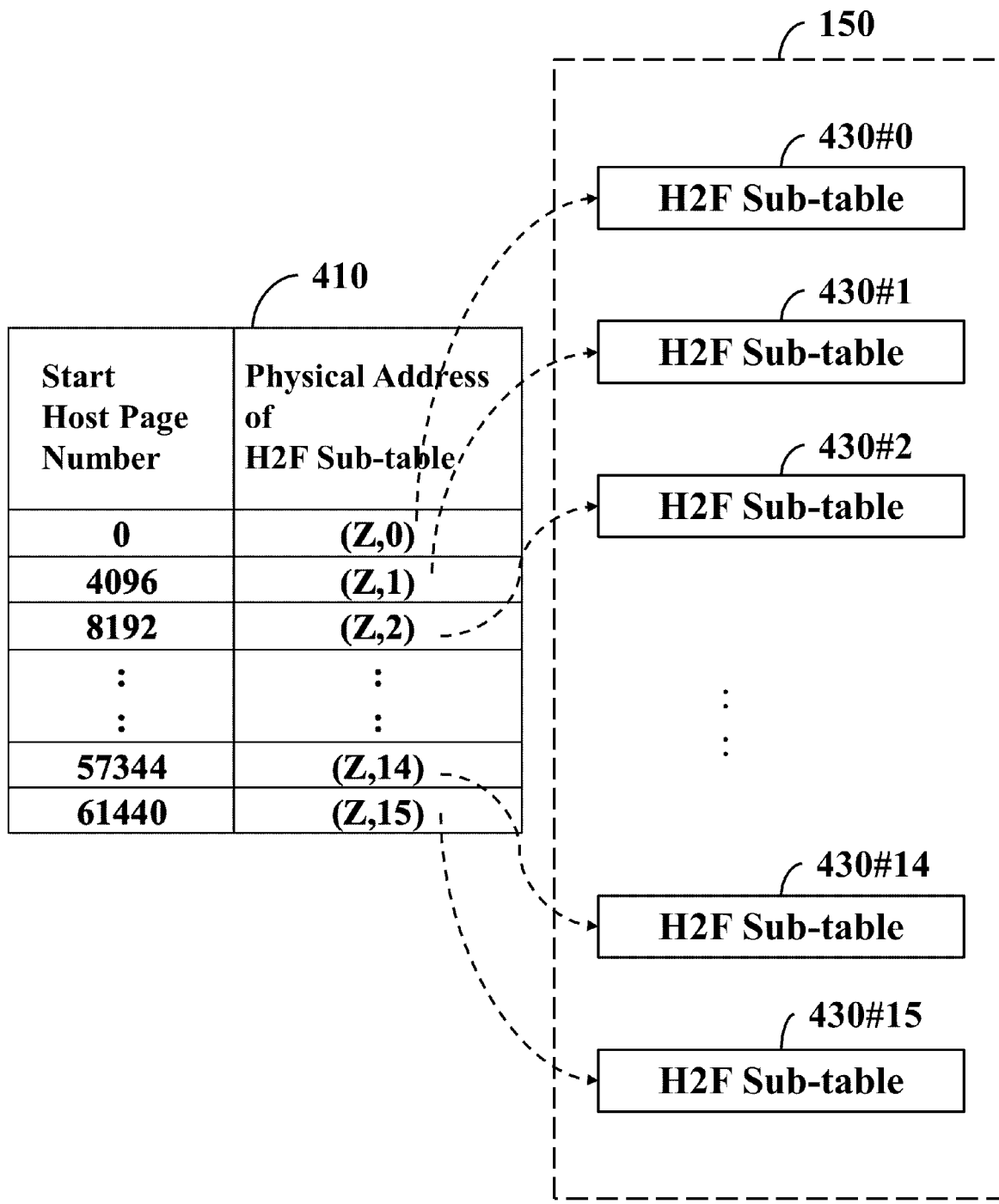
FIG. 4 is a schematic diagram illustrating the association between a high-level mapping table and host-to-flash address mapping (H2F) sub-tables according to an embodiment of the invention.

In addition to program the F2H table into the corresponding physical page of the flash module 150, the processing unit 134 updates the H2F table according to the content of the F2H table corresponding to the current block, so that the processing unit 134 when executing host read commands searches the H2F table for physical addresses that user data of particular logical addresses are physically stored in later. The H2F table contains multiple records arranged in the order of logical addresses and each record stores information indicating which physical address that user data of the corresponding logical address is physically stored in. However, because the RAM 136 cannot provide enough space to store the whole H2F table for the processing unit 134, the whole H2F table is divided into multiple H2F sub-tables and the H2F sub-tables are stored in the flash module 150, so that only necessary H2F sub-table or sub-tables are read from the flash module 150 and stored in the RAM 136 for fast look-up when data read operations are performed in the future. Refer to FIG. 4. The whole H2F table may be divided into H2F sub-tables 430 #0~430 #15. The processing unit 134 further maintains a high-level mapping table 410, which contains multiple records arranged in the order of the logical addresses. Each record stores information indicating which physical address that the corresponding H2F sub-table for a designated logical address range is physically stored in. For example, the H2F sub-table 430 #0 associated with the $0^{th}$ to the $4095^{th}$ host pages is stored in the $0^{th}$ physical page of a designated physical block of a designated LUN (the letter "Z" represents the number of the designated physical block and the designated LUN), the H2F sub-table 430 #1 associated with the $4096^{th}$ to the $8191^{th}$ host pages is stored in the $1^{st}$ physical page of the designated physical block of the designated LUN, and the remaining can be deduced by analogy. Although FIG. 4 shows 16 H2F sub-tables only, those artisans may modify the design to put more H2F sub-tables depending on the capacity of the flash module 150, and the invention should not be limited thereto.

Figure 5:
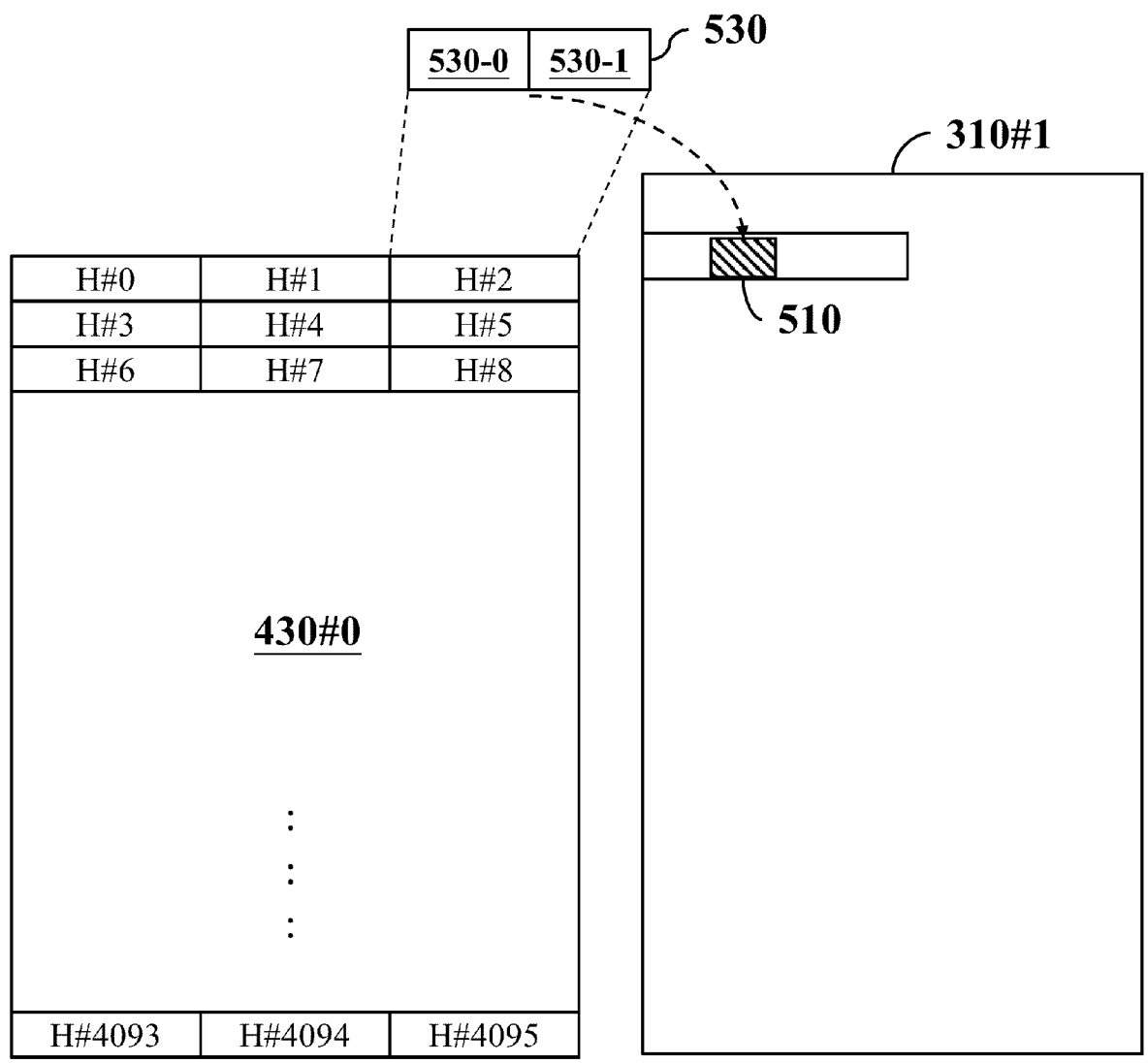
FIG. 5 is a schematic diagram illustrating a mapping of an H2F sub-table to space of a physical page according to an embodiment of the invention.

Space required by each H2F sub-table may be 4 KB, 8 KB, 16 KB, 32 KB, or others. Refer to FIG. 5. For example, the H2F sub-table stores physical location information corresponding to each logical location in the order of the logical locations. Each logical location may be represented by a host page number and each host page number is related to a fixed physical storage-space, such as 4K. Those artisans may use a LBA to represent the logical location and the invention should not be limited thereto. For example, the H2F sub-table 430 #0 stores physical-address information of the host pages H #0 to H #4095 sequentially. The Physical-address information may be represented in four bytes: the two most-significant bytes 530-0 records a physical block number and the two least-significant bytes 530-1 records a physical page number, and a sector number in a physical page. For example, the physical-address information 530 corresponding to the host page H #2 points to the physical page 510 of the physical block 310 #1. The bytes 530-0 records the number of the physical block 310 #1 and the bytes 530-1 records the number of the physical page number, and the sector number in the corresponding physical page 510.

After executing a host write command to program user data into the flash module 139 or a host discard command to discard user data of specific logical addresses stored in the flash module 139, the corresponding H2F sub-table requires to be updated accordingly, so that subsequent data read operations can be performed efficiently. Other than the execution of host erase command, the processing unit 134 when executing the host discard command does not need to perform an erase operation on the memory cells originally storing the user data of designated logical addresses immediately. In some system architectures, the RAM 136 can allocate sufficient space for storing all H2F sub-tables temporarily. Each time after driving the flash I/F 139 to program user data into the flash module 139 or discard user data of designated logical addresses from the flash module 139, the processing unit 134 may update the content of corresponding H2F sub-table to reflect the programming or discard operation. The processing unit 134 drives the flash I/F 139 to program all the H2F sub-tables in the RAM 136 into a designated system block of the flash module 150 at regular intervals or when a preset condition is satisfied. However, in alternative system architectures, the RAM 136 cannot allocate sufficient space for storing all H2F sub-tables temporarily. Thus, the processing unit 134 can only store the F2H tables that consume space much less than all the H2F sub-tables in the RAM 136 temporarily. The processing unit 134 updates corresponding H2F sub-tables according to the content of F2H table for one current block until all pages in the current block have fully stored user data or the remaining pages in the current block have filled in dummy values. Each time after a preset number of host discard commands have been executed, the processing unit 134 updates corresponding H2F sub-tables to reflect the previously executed host discard commands. Since the previously executed host write commands and host discard commands may involve multiple H2F sub-tables, in detail, the processing unit 134 searches the content of high-level mapping table 410 to find the physical addresses of corresponding H2F sub-tables, drives the flash I/F 139 to read the corresponding H2F sub-tables from the physical addresses of the flash module 150 and stores them in the RAM 136. Next, the processing unit 134 updates the physical address information of related records of the H2F sub-tables in the RAM 136 according to the content of F2H tables of the current blocks, and the previously discarded logical addresses, and drives the flash I/F 139 to program the updated H2F sub-tables into the designated system block of the flash module 150. However, in the implementations described above, when the host side 110 performs random writes, the update of too many H2F sub-tables delays the execution of subsequent host read commands and/or host write commands. Even worse, the subsequent host write commands may be timed out due to the long waiting time for the update of H2F sub-tables, causing the host side 110 to spend time and computing resources to regenerate the timed out host write commands and retransmit them to the flash controller 130.

To address the problems occurred in the implementations described above, the invention discloses an embodiment of a method, a non-transitory computer-readable storage medium or an apparatus for updating the H2F table to allocate space in the RAM 136 for several H2F sub-tables and intermediate information, which is used to update other H2F sub-tables in the flash module 150. In some embodiments, the system architecture allocates sufficient space in the RAM 136 for temporarily storing the F2H tables for the current blocks, and a portion of H2F sub-tables. In alternative embodiments, the system architecture allocates sufficient space in the RAM 136 for temporarily storing a discard queue and a portion of H2F sub-tables. In further alternative embodiments, the system architecture allocates sufficient space in the RAM 136 for temporarily storing the F2H tables for the current blocks, a discard queue and a portion of H2F sub-tables. The number of temporarily stored H2F sub-tables as described above depends on the size of the allocated space in the RAM 136. During the execution of host write commands to program data into the flash module 150 and/or host discard commands to discard designated user data stored in the flash module, the temporarily stored H2F sub-tables and intermediate information in the RAM 136 are updated. In a table update procedure, the temporarily stored H2F sub-tables (referred to as first H2F sub-tables) in the RAM 136 are programmed into the designated system block in the flash module 150, the corresponding H2F sub-tables (referred to as second H2F sub-tables) in the flash module 150 are updated according to the temporarily stored intermediate information in the RAM 136, and the updated second H2F sub-tables are programmed into the designated system block in the flash module 150.

Figure 6:
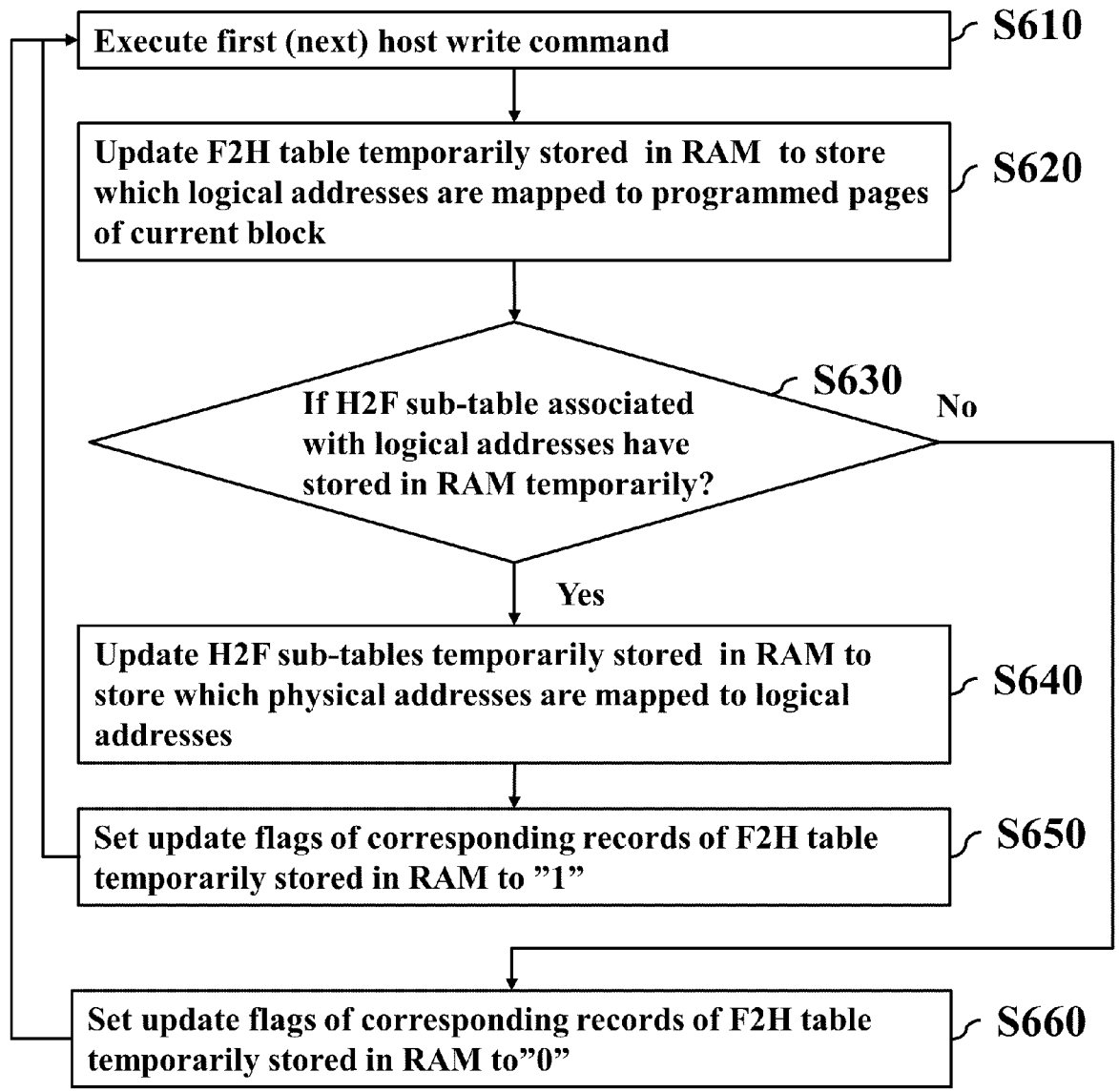
FIG. 6 is a flowchart illustrating a method for executing host write commands according to an embodiment of the invention.

An embodiment of the invention introduces a method for executing host write commands, performed by the processing unit 134 when loading the executing relevant firmware and/or software instructions. The method updates the corresponding H2F sub-table and the corresponding F2H table for the current block, which are temporarily stored in the RAM 136, for storing the up-to-date mapping information between the logical and physical addresses, and the update state each time after a host write command is executed completely. Referring to FIG. 6, the detailed operations are described as follows:

Step S610: The first (or next) host write command is executed. The processing unit 134 may drive the flash I/F 139 to program user data provided by the host side 110 into the designated pages of the current block in the flash module 150 according to the parameters (including such as logical addresses, a length, etc.) carried in the host write command.

Step S620: The F2H table for the current block temporarily stored in the RAM 136 is updated to store information indicating which logical addresses that are mapped to the programmed pages of the current block.

Step S630: It is determined whether the H2F sub-tables associated with the logical addresses have been stored in the RAM 136 temporarily. If so, then the process proceeds to step S640. Otherwise, the process proceeds to step S660.

Step S640: The corresponding H2F sub-table temporarily stored in the RAM 136 is updated to store information indicating which physical addresses that are mapped to the logical addresses.

Step S650: Update flags of corresponding records of the F2H table temporarily stored in the RAM 136 are set to "1".

Step S660: Update flags of corresponding records of the F2H table temporarily stored in the RAM 136 are set to "0".

The following examples illustrate that, in addition to storing the information of logical addresses, each record of the F2H table for the current block stores an update flag to indicate whether the mapping information of this record has been updated in the corresponding H2F sub-table temporarily stored in the RAM 136, where "1" means updated and "0" means not updated. Table 1 describes exemplary records of the F2H table for the current block as follows:

TABLE 1

| Physical Page Number | Logical Address Range | Update Flag |
|---|---|---|
| P#0 | LBA#64~95 | 1 |
| P#1 | LBA#96~127 | 1 |
| P#2 | LBA#128~159 | 1 |
| P#3 | LBA#192000~192031 | 0 |
| P#4 | LBA#192032~192063 | 0 |
| P#5 | LBA#192064~192095 | 0 |

The first to third records indicate that the physical pages P #0 to P #2 of the current block store user data of logical address LBA #64~95 (i.e. the host page H #2), LBA #96~127 (i.e. the host page H #3) and LBA #128~159 (i.e. the host page H #4), respectively, and their mapping information has been updated in the corresponding H2F sub-table temporarily stored in the RAM 136. The fourth to sixth records indicate that the physical pages P #3 to P #5 of the current block store user data of logical address LBA #192000~192031 (i.e. the host page H #6000), LBA #192032~192063 (i.e. the host page H #6001) and LBA #192064~192095 (i.e. the host page H #6002), respectively, and their mapping information cannot be updated in any H2F sub-table temporarily stored in the RAM 136. The fourth to the sixth records may be referred to as intermediate information, which is used to update the corresponding H2F sub-table stored in the flash module 150. In other words, the H2F sub-table 430 #2 associated with the logical addresses LBA #192000~192031, LBA #192032~192063 and LBA #192064~192095 hasn't been read out from the flash module 150, and the table update procedure requires to be further performed.

Figure 7:
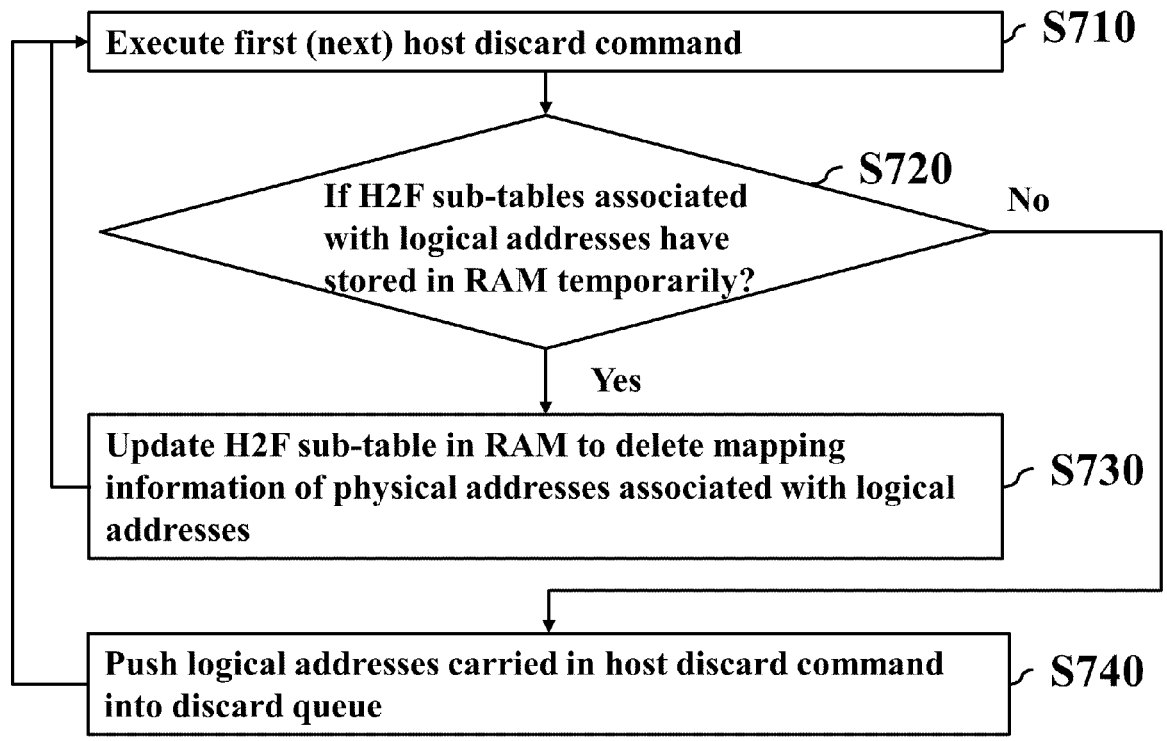
FIG. 7 is a flowchart illustrating a method for executing host discard commands according to an embodiment of the invention.

An embodiment of the invention introduces a method for executing host discard commands, performed by the processing unit 134 when loading the executing relevant firmware and/or software instructions. The method updates the corresponding H2F sub-table and a discard queue, which are temporarily stored in the RAM 136, for storing the up-to-date mapping information between the logical and physical addresses, and the update state of specific H2F sub-tables each time after a host discard command is executed completely. Referring to FIG. 7, the detailed operations are described as follows:

Step S710: The first (or next) host discard command is executed. The processing unit 134 may fetch the parameters (including such as logical addresses, a length, etc.) carried in the host discard command.

Step S720: It is determined whether the H2F sub-tables associated with the logical addresses have been stored in the RAM 136 temporarily. If so, then the process proceeds to step S730. Otherwise, the process proceeds to step S740.

Step S730: The corresponding H2F sub-table temporarily stored in the RAM 136 is updated to delete the mapping information of the physical addresses corresponding to the logical addresses. It is assumed that the host discard command instructs the flash controller 130 to discard the user data of LBA #64 to LBA #127, the processing unit 134 may fill in the physical address range fields associated with LBA #64 to LBA #127 (i.e. the host pages H #2 to H #3) in the corresponding H2F sub-table with dummy values, representing that user data of LBA #64 to LBA #127 does not exist in the flash module 150.

Step S740: The logical addresses carried in the host discard command are pushed into the discard queue to indicate that the discard information of the logical addresses hasn't been updated in the corresponding H2F sub-table.

The following examples illustrate that it is assumed that the host discard command instructs the flash controller 130 to discard the user data of the logical addresses LBA #192032~192095 (i.e. the host pages H #6001 to H #6002), and the H2F sub-table associated with the logical addresses LBA #192032~192095 is not temporarily stored in the RAM 136. Since each physical page can store 32 LBA of user data, the logical addresses LBA #192032~192095 are divided into LBA #192032~192063 and LBA #192064~192095, and the divided logical address ranges are pushed into the discard queue. Table 2 describes exemplary nodes of the discard queue as follows:

TABLE 2

| Node Number | Logical Address Range |
| --- | --- |
| N#0 | LBA#192032~192063 |
| N#1 | LBA#192064~192095 |

The content of discard queue may be referred to as intermediate information, which is used to update the corresponding H2F sub-table stored in the flash module 150.

In general, the F2H table for the current block, or the discard queue stores information about which H2F sub-tables associated with specific logical addresses need to be processed in the table update procedure. For example, each record having the update flag "0" in the F2H table for the current block stores information about the H2F sub-table corresponding to specific logical addresses needs to be processed in the table update procedure. Each node in the discard queue stores information about the H2F sub-table corresponding to specific logical addresses needs to be processed in the table update procedure.

Figure 8:
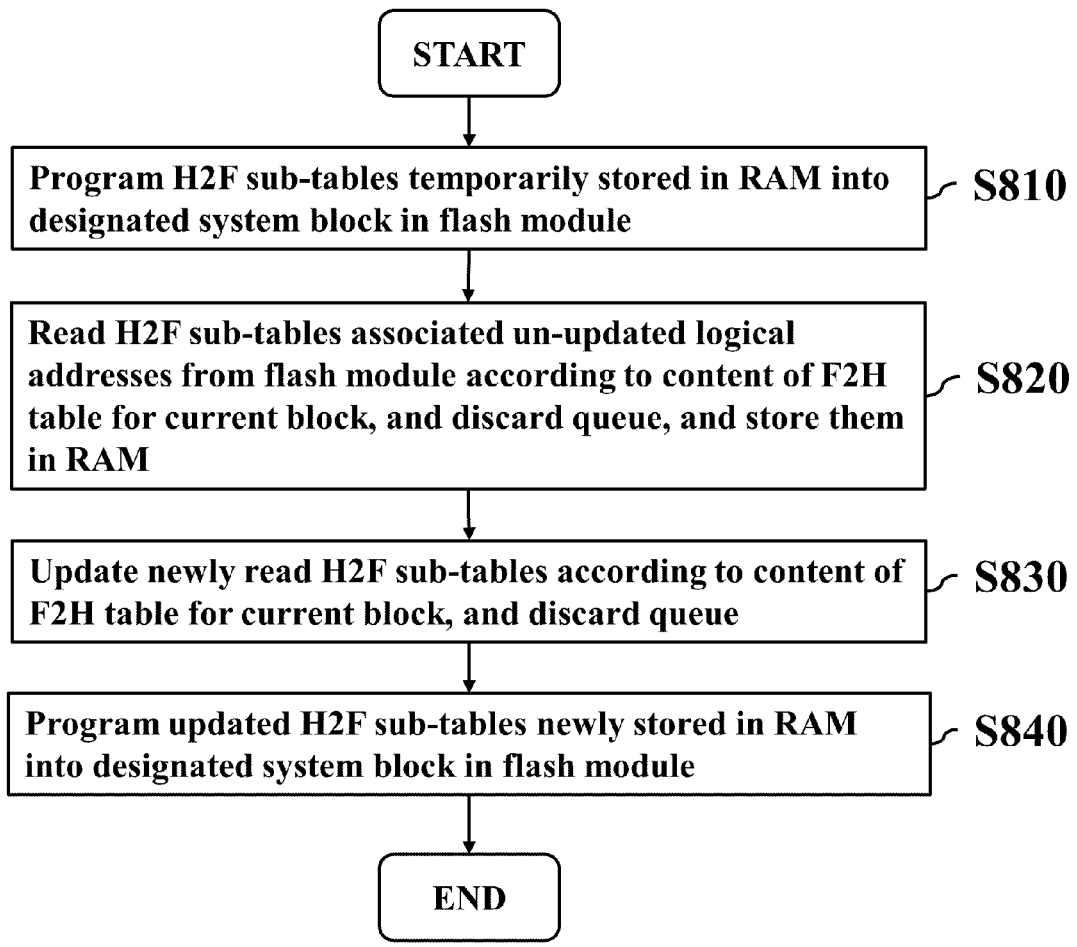
FIG. 8 is a flowchart illustrating a method for performing a table update procedure according to an embodiment of the invention.

An embodiment of the invention introduces a method for performing a table update procedure, performed by the processing unit 134 when loading the executing relevant firmware and/or software instructions. The table update procedure is performed to program the H2F sub-tables temporarily stored in the RAM 136 into the flash module 150, and update other corresponding H2F sub-tables in the flash module 150 according to the un-updated information associated with specific logical addresses indicated in the F2H table and/or the discard queue. Referring to FIG. 8, the detailed operations are described as follows:

Step S810: The H2F sub-tables temporarily stored in the RAM 136 are programmed into the designated system block in the flash module 150. It is assumed that the RAM 136 stores the H2F sub-table 430 #0: The processing unit 134 drives the flash I/F 139 to program the H2F sub-table 430 #0 in the RAM 136 into the designated system block in the flash module 150.

Step S820: The H2F sub-tables associated with un-updated logical addresses are read from the flash module 150 according to the content of F2H table for the current block, and discard queue temporarily stored in the RAM 136, and the read H2F sub-tables are stored in the RAM 136. Following the examples of the F2H table for the current block as shown in Table 1 and the discard queue as shown in Table 2, the un-updated logical addresses are LBA #192000 to LBA #192031, and the H2F sub-table 430 #2 is associated with the un-updated ones. Thus, the processing unit 134 drives the flash I/F 139 to read the H2F sub-table 430 #2 from the designated system block, and stores the H2F sub-table 430 #2 in the RAM 136.

Step S830: The newly read H2F sub-tables (for example, the H2F sub-table 430 #2) in the RAM 136 is updated according to the content of F2H table for the current block, and discard queue.

Step S840: The updated H2F sub-tables in the RAM 136 are programmed into the designated system block in the flash module 150.

The above described methods may be employed in the system architecture that cannot allocate sufficient space for all H2F sub-tables. By pre-caching a portion of the H2F sub-tables in the RAM 136, the execution time of the table update procedure would be reduced.

To make it easier for audience to understand, although the embodiments as described above use one current block as an example to illustrate operation details, those artisans may apply the technical details with relevant modifications to program H2F sub-tables for multiple current blocks in parallel, and the invention should not be limited thereto.

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuitries and arranged operably to perform the aforementioned operations. While the process flows described in FIGS. 6 to 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for updating a host-to-flash address mapping (H2F) table, performed by a flash controller, comprising:
    allocating space in a random access memory (RAM) for a first H2F sub-table and first intermediate information, which is used to update a second H2F sub-table in a flash module;
    updating the first H2F sub-table and the first intermediate information temporarily stored in the RAM during an execution of a host write command, wherein the host write command is executed to program data into the flash module, the second H2F sub-table is not stored in the RAM during the execution of the host write command, and the first intermediate information is stored in a flash-to-host address mapping (F2H) table for a current block;
    during the execution of the host write command, updating the F2H table for the current block, which is temporarily stored in the RAM, for storing information indicating which logical addresses that are mapped to a plurality of programmed pages in the current block, wherein the logical addresses comprise a first logical address associated with the first H2F sub-table and a second logical address associated with the second H2F sub-table;
    for the first logical address, updating the first H2F sub-table for storing information indicating which physical address is mapped to the first logical address, and setting a first update flag corresponding to the first logical address in the F2H table for the current block to a first value;
    for the second logical address, setting a second update flag corresponding to the second logical address in the F2H table for the current block to a second value; and
    in a table update procedure, programming the first H2F sub-table temporarily stored in the RAM into a system block in the flash module, updating the second H2F sub-table according to the first intermediate information stored in the RAM, and programming updated second H2F sub-table into the system block in the flash module.

2. The method of claim 1, wherein the RAM does not allocate space for all H2F sub-tables.

3. The method of claim 1, wherein the first value indicates that mapping information for a corresponding logical address has been updated in any H2F sub-table temporarily stored in the RAM, and the second value indicates that mapping information for a corresponding logical address hasn't been updated in any H2F sub-table temporarily stored in the RAM.

4. The method of claim 1, comprising:
    in the table update procedure, updating the second H2F sub-table according to mapping information associated with each update flag being set to the second value in the F2H table for the current block.

5. The method of claim 1, wherein second intermediate information is stored in a discard queue, and a host discard command is executed to discard data in the flash module, the method comprising:
    during an execution of the host discard command, determining whether a logical address carried in the host discard command is associated with the first H2F sub-table;
    when the logical address carried in the host discard command is associated with the first H2F sub-table, updating the first H2F sub-table for storing information indicating that user data of the logical address carried in the host discard command is discarded; and
    when the logical address carried in the host discard command is associated with the second H2F sub-table, pushing the logical address carried in the host discard command into the discard queue as the second intermediate information to indicate that the second H2F sub-table needs to update to store information indicating that user data of the logical address carried in the host discard command is discarded.

6. The method of claim 5, comprising:
    in the table update procedure, updating the second H2F sub-table according to the logical address in the discard queue.

7. A non-transitory computer-readable storage medium for updating a host-to-flash address mapping (H2F) table when executed by a processing unit, the non-transitory computer-readable program product comprising program code to:
    allocate space in a random access memory (RAM) for a first H2F sub-table and first intermediate information, which is used to update a second H2F sub-table in a flash module;
    update the first H2F sub-table and the first intermediate information temporarily stored in the RAM during an execution of a host write command, wherein the host write command is executed to program data into the flash module, the second H2F sub-table is not stored in the RAM during the execution of the host write command, and the first intermediate information is stored in a flash-to-host address mapping (F2H) table for a current block;
    during the execution of the host write command, update the F2H table for the current block, which is temporarily stored in the RAM, for storing information indicating which logical addresses that are mapped to a plurality of programmed pages in the current block, wherein the logical addresses comprise a first logical address associated with the first H2F sub-table and a second logical address associated with the second H2F sub-table;

for the first logical address, update the first H2F sub-table for storing information indicating which physical address is mapped to the first logical address, and set a first update flag corresponding to the first logical address in the F2H table for the current block to a first value;

for the second logical address, set a second update flag corresponding to the second logical address in the F2H table for the current block to a second value; and in a table update procedure, program the first H2F sub-table temporarily stored in the RAM into a system block in the flash module, update the second H2F sub-table according to the first intermediate information stored in the RAM, and program updated second H2F sub-table into the system block in the flash module.

8. The non-transitory computer-readable storage medium of claim 7, wherein the RAM does not allocate space for all H2F sub-tables.

9. The non-transitory computer-readable storage medium of claim 7, comprising program code to:
in the table update procedure, update the second H2F sub-table according to mapping information associated with each update flag being set to the second value in the F2H table for the current block.

10. The non-transitory computer-readable storage medium of claim 7, wherein the first value indicates that mapping information for a corresponding logical address has been updated in any H2F sub-table temporarily stored in the RAM, and the second value indicates that mapping information for a corresponding logical address hasn't been updated in any H2F sub-table temporarily stored in the RAM.

11. The non-transitory computer-readable storage medium of claim 7, wherein second intermediate information is stored in a discard queue, a host discard command is executed to discard data in the flash module, the non-transitory computer-readable storage medium comprising program code to:
During an execution of the host discard command, determine whether a logical address carried in the host discard command is associated with the first H2F sub-table;
when the logical address carried in the host discard command is associated with the first H2F sub-table, update the first H2F sub-table for storing information indicating that user data of the logical address carried in the host discard command is discarded; and
when the logical address carried in the host discard command is associated with the second H2F sub-table, push the logical address carried in the host discard command into the discard queue as the second intermediate information to indicate that the second H2F sub-table needs to update to store information indicating that user data of the logical address carried in the host discard command is discarded.

12. The non-transitory computer-readable storage medium of claim 11, comprising program code to:
in the table update procedure, update the second H2F sub-table according to the logical address in the discard queue.

13. An apparatus for updating a host-to-flash address mapping (H2F) table, comprising:
a random access memory (RAM);
a flash interface (I/F), coupled to a flash module; and
a processing unit, coupled to the RAM and the flash I/F, arranged operably to: allocate space in the RAM for a first H2F sub-table and first intermediate information, which is used to update a second H2F sub-table in the flash module; update the first H2F sub-table and the first intermediate information temporarily stored in the RAM during an execution of a host write command, wherein the host write command is executed to program data into the flash module, the second H2F sub-table is not stored in the RAM during the execution of the host write command or the host discard command, and the first intermediate information is stored in a flash-to-host address mapping (F2H) table for a current block; during the execution of the host write command, update the F2H table for the current block, which is temporarily stored in the RAM, for storing information indicating which logical addresses that are mapped to a plurality of programmed pages in the current block, wherein the logical addresses comprise a first logical address associated with the first H2F sub-table and a second logical address associated with the second H2F sub-table; for the first logical address, update the first H2F sub-table for storing information indicating which physical address is mapped to the first logical address, and set a first update flag corresponding to the first logical address in the F2H table for the current block to a first value; for the second logical address, set a second update flag corresponding to the second logical address in the F2H table for the current block to a second value; and in a table update procedure, program the first H2F sub-table temporarily stored in the RAM into a system block in the flash module through the flash I/F, update the second H2F sub-table according to the first intermediate information stored in the RAM, and program updated second H2F sub-table into the system block in the flash module through the flash I/F.

14. The apparatus of claim 13, wherein the RAM does not allocate space for all H2F sub-tables.

15. The apparatus of claim 13, wherein the first value indicates that mapping information for a corresponding logical address has been updated in any H2F sub-table temporarily stored in the RAM, and the second value indicates that mapping information for a corresponding logical address hasn't been updated in any H2F sub-table temporarily stored in the RAM.

16. The apparatus of claim 13, wherein the processing unit is arranged operably to: in the table update procedure, update the second H2F sub-table according to mapping information associated with each update flag being set to the second value in the F2H table for the current block.

17. The apparatus of claim 13,
wherein second intermediate information is stored in a discard queue, and a host discard command is executed to discard data in the flash module,
wherein the processing unit is arranged operably to: during an execution of the host discard command, determine whether a logical address carried in the host discard command is associated with the first H2F sub-table; when the logical address carried in the host discard command is associated with the first H2F sub-table, update the first H2F sub-table for storing information indicating that user data of the logical address carried in the host discard command is discarded; and when the logical address carried in the host discard command is associated with the second H2F sub-table, push the logical address carried in the host discard command into the discard queue as the second intermediate information to indicate that the second H2F sub-table needs to update to store information indicating that user data of the logical address carried in the host discard command is discarded.

18. The apparatus of claim 17, wherein the processing unit is arranged operably to: in the table update procedure, update the second H2F sub-table according to the logical address in the discard queue.

* * * * *